United States Patent Office 3,471,413
Patented Oct. 7, 1969

3,471,413
FORMATION OF A CATALYST CARRYING ALUMINA SURFACE ON A BASE ELEMENT
George L. Hervert, Downers Grove, Ill., assignor to Universal Oil Products Company, Des Plaines, Ill., a corporation of Delaware
No Drawing. Filed July 22, 1965, Ser. No. 474,164
Int. Cl. B01j 11/40; C01f 7/02
U.S. Cl. 252—463                                       6 Claims

ABSTRACT OF THE DISCLOSURE

Method for forming a porous alumina surface on a normally rigid base element having a ceramic surface. A coating of finely divided aluminum particles is applied to the surface of the element as by brushing, blowing or preferably by applying a coating of aluminum paint. The thusly coated element is then subjected to a high temperature oxidation for a time sufficient to provide a softening of the surface of the ceramic coating and to form a gamma-alumina surface thereon from the aluminum particles to provide a tenaciously held, high porosity surface suitable for carrying an active catalyst component.

---

The present invention is directed to a method for forming a suitable catalyst carrying alumina surface on a base element, which base may comprise various types of substrates, including different forms of rigid ceramics, fire brick, glass, metal, as well as metal-ribbons or wires, and the like, which may be somewhat flexible.

By using present day techniques and developments in the catalyst field, it is quite customary to be able to produce high quality catalyst support materials of various inorganic oxides which may be used alone or in admixture with one another, such as alumina, silica, boria, magnesia, vanadia, silica-alumina, alumina-silica-boria, and the like. Such support materials may be in powdered or pellet form, as well as in micro or macro spherical subdivided form, resulting from spraying or dropping techniques. However, where larger elements or special rigid shapes are desired there has been a problem in obtaining a proper type of base material which can withstand high temperature conditions and at the same time have a high surface area suitable for the deposition of an active catalyst component. Different forms of non-glassy porcelains and ceramics which have high temperature resistance have been impregnated with various catalytic components to provide resulting catalytically active elements; however, the usual types of porcelain or ceramic materials have a limited amount of porosity or surface area which can become coated with the active catalyst component. Thus, the overall activity and catalyst life is somewhat limited. Also, with respect to the all metal forms of catalyst, such as alloy metals which are plated with active metal components comprising platinum, palladium, or other platinum group metals, noble metals, or mixtures thereof, there is a high density surface with no porosity and quite limited surface area. In order to provide maximum surface areas for metal base catalysts, there have been various forms of crinkled ribbon constructions that are subjected to noble metal plating and activation to provide for an active form of catalyst. However, such constructions still do not provide the desired high surface areas such as are available from the inorganic oxide support materials, even though they are of benefit in case of placement and removal and do not provide the problems of packing and breaking that are encountered with the low density porous support particles.

It is a principal object of the present invention to provide for the formation of improved catalyst carrying metal oxide surfaces on various types of rigid substrates or shaped base materials.

It is a further object of the present invention to provide for the formation of a high surface area gamma-alumina catalytic carrying surface on shaped base materials, including means for forming the alumina surface in situ on a smooth surface.

One aspect of the present invention provides a method for forming a porous alumina surface suitable as a catalyst carrier, which comprises, cleaning the surface of the base element and applying a coating of finely divided aluminum particles to the surface thereof, subjecting the thusly coated element to oxidation in an oxidizing atmosphere at a temperature above the melting point of aluminum, or above about 1220° F., to provide for the direct formation of a gamma-alumina surface on the base element with a resulting high surface area.

Aluminum particles may be brushed, blown, or otherwise coated onto a surface, but as an easy means for effecting the distribution of the finely divided aluminum particles to the surface of the base element, it is preferred to have the particles of aluminum suspended in a liquid carrier which has a high percentage of hydrocarbons, volatile mineral spirits and driers and then coating the element with one or more coatings or layers. Upon subjecting the coated base element to high temperature in an oxidizing atmosphere there will be a substantially complete oxidation and removal of the volatile vehicle leaving the aluminum particles in a resulting gamma-alumina form providing a tenaciously held high porosity surface suitable for carrying an active catalyst component.

With a non-glassy ceramic or porcelain surface, or with glass, fire brick, and the like, there may be a cleaning of the surface of the base element and a direct deposition of the aluminum particles by means of a powder, liquid vehicle, or otherwise, and then a subsequent oxidizing step in an oxidizing atmosphere suitable to remove the vehicle and to form a gamma-alumina coating to the base element. On the other hand, where smooth metallic surfaces are to be coated to provide resulting substantially rigid form catalyst units, it is preferable to provide a porcelain or "ceramic coating" to the metal as a preliminary first stage of support formation, subsequently coating the porcelain or ceramic coating with aluminum particles, then subjecting the thusly coated element to a high temperature oxidizing step in the presence of an oxidizing atmosphere at a temperature at least above about 1220° F. and sufficient to provide slight softening of the ceramic coating on the metal whereby there is a resulting permanent adhesion of the gamma-alumina high porosity surface thereon which can be used as a catalyst carrier. The use of the ceramic coating over the metal appears to withstand subsequent temperature changes to a far better extent than methods of preparation where the aluminum oxide is formed directly on a smooth metal surface having no undercoating.

The term "alumina" as used herein shall be considered to include other metal components in admixture with alumina. For example, magnesium metal, or zinc, etc. may be coated onto the base surface along with the aluminum particles such that the resulting oxide surface may comprise a mixture of aluminum oxide and magnesium oxide or of alumina and zinc oxide, or whatever.

The term "ceramic coating" as used herein is generic and includes the various types of functional porcelain that will make "glass hard," relatively thin coatings which are not necessarily smooth and glossy. The porcelain surface is generally an alkali-alkaline earth-boro-silicate complex which can be formed by incorporating a frit or a combination of milled or ground particles of frit on to the surface of the element which will have the ceramic coating and heating such coating to a temperature sufficient to effect a bond with the metal surface. Many variations of frits and porcelain coatings may be made to provide high service temperature resistance which will vary somewhat, and may be as high as 2000° F. Such coatings will normally have some small degree of flexibility and also a coefficient of expansion which will be similar to that of metals.

Thus, in another aspect the present invention provides a method for forming a porous alumina surface suitable as a high surface area catalyst carrying base element, which comprises, cleaning the surface of said element and applying a thin ceramic coating thereto, subsequently applying a coating of finely divided aluminum particles to the surface of said ceramic coating and then subjecting the thusly coated element to oxidation in an oxidizing atmosphere at a temperature for a time period sufficient to provide for a slight softening of the surface of said ceramic coating and the furnishing of a gamma-alumina surface thereon from said aluminum particles.

The following examples are set forth to show the improved method for obtaining a tenacious metal oxide coating, suitable for a high surface area catalyst support, on various rigid refractory base materials.

Example I

An aluminum paint (comprising finely divided aluminum particles suspended in a volatile liquid vehicle and known commercially as Krylon No. 1401, with approximately 92.34% volatile hydrocarbons, 5.50% non-volatile acrylic ester resin and 2.16% aluminum powder as pigment) was applied by spraying it to one surface of a small Pyrex glass plate of approximately $3/16''$ thickness (Corning glass No. 7740). The coated plate was allowed to dry for a short period and then placed in an electric furnace and heated to 850° C. (1562° F.) in ambient air. The plate was removed after a 30 minute period and was found to have a hard light gray coating which could only be removed by scratching it with a hard instrument. A subsequent X-ray diffraction analysis showed the coating to be gamma-alumina, with no alpha-alumina nor any aluminum present.

Example II

In this test, a Glasrock Foam Block, No. 25 (which is approximately 98% alpha-silicon oxide, and about 2% alpha-alumina as the major impurity) was coated with an aluminum paint (Krylon No. 1401) in the same manner as that set forth in connection with Example I. The coated Glasrock Block was also subjected to heating in the electric furnace for 30 minutes at 850° C. and found to have a resulting hard light gray coating which was tenaciously held to the block.

Example III

In another test, Armstrong A–20 fire brick (consisting of approximately 68% silica, 27% alpha-alumina, and other minor impurities) was coated with Krylon No. 1401 and heat treated in the same manner as set forth in the previous examples. The resulting gamma-alumina coated fire brick base material had a hard light gray coating which could only be removed by scratching with a hard instrument.

Example IV

In another test to show the effect of a longer heat treating period, a test piece of a Pyrex glass, similar to that used in Example I, was coated with Krylon No. 1401. However, in this instance, the sample was heated in the electric furnace at 850° C. for a 27 hour period in the presence of ambient air. On the coated portion there appeared to be no changes compared to Example I except that the alumina coating was of a slight lighter gray color. Again it was tenaciously attached to the glass and appeared to act as a protective shield. An uncoated portion of the Pyrex glass, after the extended heating period, was covered with a loose layer of white material about $1/32''$ in thickness, and was presumed to be alpha-silica. This loose layer could be easily chipped from the glass surface. An X-ray diffraction analysis of the alumina deposit on the glass sample indicated the presence of primarily gamma-alumina with no alpha-alumina being detected.

Example V

In still another test utilizing Pyrex glass as a base material, a test piece of Pyrex glass (Corning No. 7740) was coated with Glidden Company Metallite Aluminum Paint. (The Metallite Aluminum Paint contained approximately 19.3% aluminum paste, 31.5% non-volatile vehicle comprising Coumarone-Indene Resin and Linseed Oil and 49.2% volatile mineral spirits and driers.) The coated plate was allowed to dry in air for a short period and then placed in an electric furnace and heated in the presence of air at 850° C. for an approximate 60 minute period. The resulting coating on the glass seemed to have a good adhesion but was quite rough due to the presence of small cavitation probably caused by broken bubbles of paint. The bubbles were in turn believed to be due to the presence of a greater amount of non-volatile vehicles in the paint.

Example VI

In this test, a smooth sample of mild steel plate was coated with a Glidden Metallite Aluminum Paint in the same manner as that set forth in the previous example. In this instance, after the 850° C. heat treatment for a 1 hour period there was a resulting loose coating of alumina. Most of the coating was removable from the steel by rubbing with water on the surface of the steel with a towel. The alumina coating was also of a rough nature on the steel plate as described in connection with the coating on the Pyrex sample of Example V.

Example VII

In this test a mild steel plate was given one coat of aluminum paint (Krylon No. 1401), which coating was measured after drying to show that there was approximately 0.0029 gram of aluminum pigment per square inch on the plate. The coated plate was, in accordance with prior testing procedures, heated in the presence of air in an electric furnace at 850° C. for a 40 minute period. In this instance, it has found that the single coating provided an insufficient, non-uniform coating to the steel sample; however, the resulting smooth portions of the alumina coating appeared to be tenaciously held to the steel.

A further heat treatment of this sample for a three hour period resulted in the total coated surface of the plate being covered with large blisters and much spalling occurred.

Example VIII

For comparison purposes, a steel plate such as described in the previous example was given two coats of Krylon Aluminum Paint No. 1401 such that there was provided 0.0066 gram per square inch of aluminum pigment. At the end of a 40 minute period of 850° C. oxidizing treatment, in the presence of air, there was a uniform light gray alumina coating which appeared to be tenaciously held to the steel surface. At the end of a 3 hour oxidizing period, the entire coated surface had large blisters and some spalling. Only about 10% of the alumina coating adhered to the surface.

Example IX

In this test, three different spray coats of Krylon No. 1401 aluminum paint were applied to a metal test of plate in the manner of the previous two examples to provide 0.0112 gram of aluminum pigment per square inch. After a 40 minute oxidizing treatment at 850° C. the resulting light gray alumina coating appeared to be tenaciously held to the steel plate and had a uniform light gray color and appearance. In this instance, at the end of the 3 hour treating period, it was found that the major portion of the surface had very small blisters with some spalling; however, approximately 30% of the alumina coating remained tenaciously held to the steel surface.

Example X

In still another test, a steel sample plate was spray coated with four different coats of the Krylon No. 1401 paint to provide a resulting 0.0161 gram of aluminum pigment per square inch. At the end of the 40 minute period of oxidizing treatment at 850° C., the resulting alumina coating had a uniform light gray color which was tenaciously held to the surface. The subsequent extended 3 hour heat treating period resulted in approximately 80% of the alumina surface still being held tenaciously to the steel surface and provided the best appearance with respect to the previous three examples.

Example XI

In this test, a piece of stainless steel plate (Type No. 321) was coated with a porcelain of a "greencoat" type. The procelain being "Green Color No. SL–13290–B," supplied by the Chicago Vitreous Co. Such coating is of a type furnished to withstand service temperatures of the order of 1800° F. The resulting porcelainized stainless steel sample was then given three separate spray coats of aluminum paint (Krylon No. 1401) and subjected to drying at about 212° F. for a short period of time. The drying step was followed by electric furnace heat treating in an oxidizing atmosphere at 1800° F. for a ten minute period. The resulting aluminum oxide coating was of a light gray color and was tenaciously held to the porcelain coated stainless steel. An X-ray diffraction analysis showed the coating to be gamma-alumina.

Example XII

In this test, a mild steel plate with white porcelain coating (obtained from a commercial white laboratory tray) was given three different coats of aluminum paint (Krylon No. 1401). The resulting coated test piece was oxidized at 850° C. for a 30 minute period in the electric furnace in the presence of air and again there was provided a resulting light gray alumina coating which also tenaciously held to the porcelainized surface. An X-ray diffraction analysis showed that the alumina coating was primarily gamma-alumina.

Example XIII

In a comparative test, a mild steel plate was coated with a 50:50 mixture of alumina sol (comparing about 13.5% aluminum and 10.7% as chloride which had been prepared by dissolving aluminum in hydrochloric acid) and a 28% solution of hexamethylene-tetramine (HMT). This alumina coated steel plate was placed in the electric furnace and treated under oxidizing conditions at 850° C. for a 30 minute period in the same manner as set forth in Examples VI and XI. In this instance, the alumina coating on the surface of the steel plate had no adhesion whatsoever and immediately peeled off.

Example XIV

In another comparative test, an alumina sol-HMT mixture was applied to the surface of a piece of Pyrex glass, such as used in Example I, and the test piece was then subjected to the 850° C. oxidizing treatment for a 30 minute period. In this instance, the alumina coating also peeled from the smooth surface of the Pyrex glass with no adhesion being accomplished.

It will be noted from reviewing the results of the hereinbefore set forth examples, that the most tenaciously held gamma-alumina coatings with high surface area were obtained through the use of aluminum metal pigments being suspended in suitable volatile vehicles. Further, it appears that the type of vehicle providing the most tenaciously held alumina was accomplished with the aluminum paint having the greater percentage of volatile vehicle. Stated another way, it appears that the coating having the greater amount of non-volatile vehicle (31.5% in the Glidden aluminum paint as compared with 5.5% of non-volatile vehicle in the Krylon paint) had a detrimental effect on the tenacious bonding by causing more blister formation in the resulting alumina coating.

From the results obtained, it seems that the tenaciously held gamma-alumina on the glass and porcelain surfaces results from using the 1562° F. (850° C.) oxidizing temperature which provides that the aluminum and glass are in a liquid or semi-liquid state, (aluminum melting at 660° C. and the Pyrex glass softening at 820° C.). Subsequent reaction of the oxidizing conditions would tend to have newly formed larger alumina particles wedge into the glass matrix. The same reaction appears to occur with the various ceramic (porcelain) coatings.

With respect to steel substrates, there may be limited solubility or alloying of aluminum in steel at the 1562° F. temperature and some wedging of alumina into the surface. On the other hand, the continued oxidizing heat treatment at high temperature of the alumina on the unprotected steel substrates leads to spalling which possible results from some spalling of the surface of the steel substrate itself, as well as possibly from difference in coefficients of expansions between gamma-alumina and the steel. However, the latter troubles are apparently eliminated by first providing a ceramic coating to the steel substrate. The ceramic coating protects the steel surface from spalling and permits a tight tenacious wedging of the alumina to the coated surface in the same manner as obtained with glass and porous surfaces.

In connection with the use of catalytically coated elements for certain fume incineration reactions, it is desirable to have electric heating of the catalyst unit. This can be accomplished by introducing current through grids or mats of conductive metal wires or ribbons which are in turn coated with platinum, palladium and other noble metals to provide an active oxidizing surface. The usual electro-deposition of the noble metal catalyst surface on clean metal of course provides a very limited surface area as hereinbefore pointed out. However, by utilizing the teachings of the present invention, a wire element, screen, or mat of metal wire or ribbon which can provide electrical resistance and heat generation, may be cleaned and covered with a precursor layer of ceramic coating which upon firing will produce a porcelain sheath. Coverage may be complete or partial, depending on the desired flexibility of the base element. Actually, most thin ceramic coatings are somewhat flexible and have coefficients of expansion which are not greatly different from mild steel or stainless steel.

I claim as my invention:

1. A method for forming a porous alumina surface, suitable as a high surface area catalyst carrier, to a substantially smooth metal base element, which comprises, applying a thin porcelain coating thereto, subsequently applying a coating of finely divided aluminum particles suspended in a volatile liquid vehicle directly to the surface of said porcelain coating, and then subjecting the thusly coated element to oxidation in an oxidizing atmosphere at a temperature above about 1220° F. and for a time period sufficient to provide a softening of the surface of said porcelain coating and to form a tenaciously held high porosity gamma-alumina surface thereon from said aluminum particles.

2. The method of claim 1 further characterized in that said metal base element comprises mild carbon steel.

3. The method of claim 1 further characterized in that said metal base element comprises stainless steel.

4. The method of claim 1 further characterized in that said metal base element comprises electrically conductive wire.

5. The method of claim 1 further characterized in that said coating of finely divided aluminum particles suspended in a volatile liquid vehicle is an aluminum paint.

6. A method for forming a porous alumina surface, suitable as a high surface area catalyst carrier, on a generally smooth metal base element, which comprises, cleaning the surface of said element and applying a thin porcelain coating thereto, subsequently applying directly to the surface of said porcelain coating a coating of finely divided aluminum particles suspended in a liquid vehicle which contains more than 50% volatile materials, and then subjecting the thusly coated element to oxidation in an oxidizing atmosphere at a temperature above about 1220° F. and for a time period sufficient to provide a softening of the surface of said porcelain coating and to form a tenaciously held high porosity gamma-alumina surface thereon from said aluminum particles.

References Cited

UNITED STATES PATENTS

| | | | |
|---|---|---|---|
| 2,636,865 | 4/1953 | Kimberlin | 252—463 |
| 3,147,154 | 9/1964 | Cole et al. | 252—439 |
| 3,167,499 | 1/1965 | Haresnape et al. | 252—477 |
| 3,189,563 | 6/1965 | Havel | 252—477 |
| 3,228,892 | 1/1966 | Cole et al. | 252—477 |
| 3,231,520 | 1/1966 | Leak et al. | 252—477 |
| 2,042,451 | 6/1936 | Bond et al. | 252—463 |

DANIEL E. WYMAN, Primary Examiner

P. E. KONOPKA, Assistant Examiner

U.S. Cl. X.R.

23—2, 141, 142; 117—69, 70; 252—477